PAUL KORWIN
INVENTOR.

Nov. 28, 1967  P. KORWIN  3,355,362
HYDROCARBON CATALYTIC REACTOR WITH THERMALLY
INSULATED EXPANSION TRANSFER CONDUIT
Filed Oct. 7, 1965  2 Sheets-Sheet 2

PAUL KORWIN
INVENTOR.

BY J. T. Chaboty.
AGENT

United States Patent Office 3,355,362
Patented Nov. 28, 1967

3,355,362
HYDROCARBON CATALYTIC REACTOR WITH THERMALLY INSULATED EXPANSION TRANSFER CONDUIT
Paul Korwin, Flushing, N.Y., assignor to Chemical Construction Corporation, New York, N.Y., a corporation of Delaware
Filed Oct. 7, 1965, Ser. No. 493,646
9 Claims. (Cl. 196—136)

ABSTRACT OF THE DISCLOSURE

A hydrocarbon catalytic reactor apparatus is provided for primary steam reforming of a fluid hydrocarbon followed by secondary reforming with air in a separate vessel. A thermally insulated linear expansion conduit, having a central expansion conduit section extending to terminal sleeves with sliding fit contact, is provided to conduct the hot partially reformed gas mixture from the primary reformer to the secondary reformer. The linear expansion conduit is preferably provided in combination with linking conduits having at least two sections of different linear directions.

---

Figure 1:
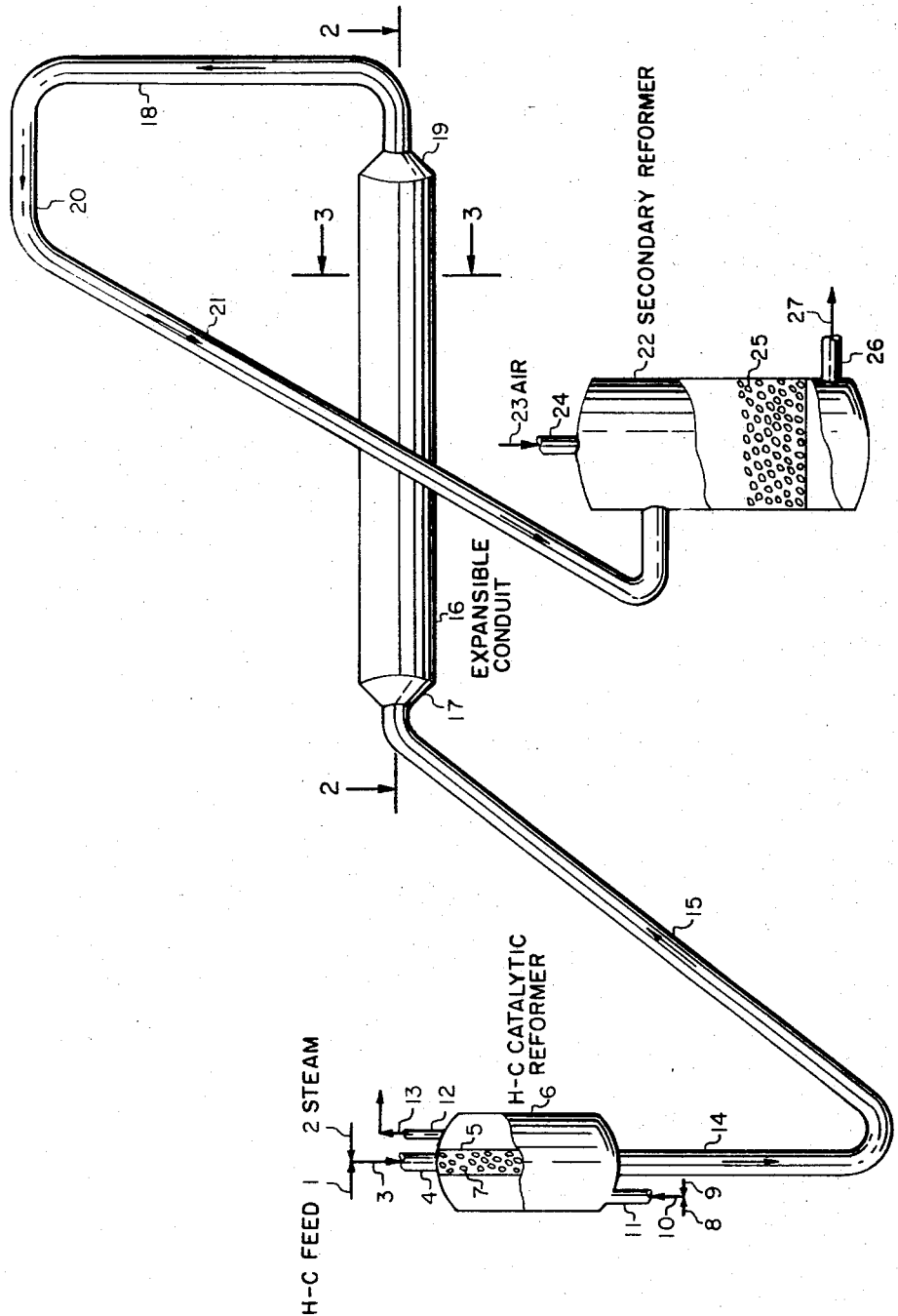

The present invention relates to a piping assemblage for transferring a high temperature fluid from a rigidly fixed source to a rigidly fixed destination. The piping assemblage of the present invention is compensated so as to be substantially free of thermal stress due to temperature changes in service, and is preferably applicable as an apparatus for transferring partially reformed or crude synthesis gas from a primary steam reformer to a secondary reformer.

Numerous piping or apparatus assemblages have been suggested for transferring a fluid at elevated temperature, in which thermal stress due to temperature differential is accommodated or compensated by the provision of special structure. In cases where temperature change is small, the transfer piping will usually consist of a single pipe or conduit, which is provided with a U-bend or loop section to accommodate for piping elongation or deformation in service. However, in numerous instances a relatively large temperature change may be experienced in service, with resultant substantial thermal elongation or deformation of the transfer piping. In these cases, a simple loop or U-bend in the piping will not provide adequate compensation and reduce thermal stress in service to an acceptable level, unless the loop or U-bend is inordinately large, in which case the piping assemblage becomes very costly and impractical.

The transfer of partially reformed crude synthesis gas from a primary steam reformer to a secondary reformer is one instance in which specialized transfer piping is required, in order to compensate for thermal stress. The catalytic primary steam reforming of a fluid hydrocarbon such as methane produces a crude synthesis gas containing unreacted hydrocarbon at a highly elevated temperature, such as about 850° C. This crude synthesis gas is then transferred to a secondary reformer vessel, in which air is added to the synthesis gas stream. The ensuing combustion reaction produces a further temperature rise, and the gas stream is further reformed in contact with a catalyst bed in the secondary reformer vessel. Thus, the transfer of the hot synthesis gas from the primary reformer to the secondary reformer must be carried out in transfer piping of special configuration, because the transfer piping is subject to temperatures ranging from ambient up to 850° C. or higher.

In the present invention, a compensated transfer piping assemblage is provided for high temperature service, which is substantially free of thermal stress at elevated temperatures. The apparatus of the present invention includes a pipe or conduit which is mounted at its ends within sleeves with sliding fit contact, so that the conduit is free to expand at both ends and thus accommodate for linear thermal expansion. The conduit is disposed within a coaxial external conduit, which is maintained at a reduced temperature by the provision of refractory packing in the annular space between the conduits. Connecting conduits are provided which connect the sleeves with the rigidly fixed source of high temperature fluid and the rigidly fixed destination. In a preferred embodiment of the invention, the first connecting conduit connecting the fluid source with a sleeve is provided with a vertical section and a horizontal section, and the second connecting conduit connecting the other sleeve with the fluid destination is provided with a vertical section and two horizontal sections. The vertical sections of the connecting conduits are parallel and of equal length, one of the horizontal sections of the second connecting conduit is parallel with the coaxial external conduit in which the refractory packing and expandable conduit are disposed, and the other horizontal section of the second connecting conduit is parallel with and of length equal to that of the horizontal section of the first connecting conduit.

The principal advantage of the present invention is that the transfer piping system is compensated for thermal expansion, and thus is substantially free of thermal stress under elevated temperature service. When the connecting conduits are provided with vertical and horizontal sections as described supra, the transfer piping assembage is fully compensated, and compensating linear thermal expansion of the various members takes place such that the assemblage is completely free of thermally induced stress, regardless of temperature changes which may take place in service. Another advantage of the apparatus of the present invention is that the piping assemblage is simple and readily fabricated, and thus is less costly than other transfer piping arrangements. In particular, the apparatus of the present invention is substantially less costly than a direct transfer pipe or conduit provided with a loop or U-bend, since for elevated temperature service the loop or U-bend which is required for stress-free service is extremely large and requires a large amount of costly piping.

It is an object of the present invention to provide an improved transfer piping for elevated temperature service.

Another object is to provide a transfer piping assemblage for elevated temperature service which is substantially free of thermally induced stress.

A further object is to provide a transfer piping assemblage for elevated temperature service which is fully compensated for linear thermal expansion in service.

An additional object is to provide a transfer piping assemblage for elevated temperature service which is relatively simple, inexpensive, and readily fabricated.

Still another object is to provide a transfer piping assemblage for elevated temperature service in which a conduit or section of the assemblage is disposed so as to be free to expand at both ends in a linear direction.

These and other objects and advantages of the present invention will become evident from the description which follows. Referring to the figures, FIGURE 1 provides an overall isometric view of a preferred embodiment of the apparatus of the present invention as applied to the transfer of crude synthesis gas at elevated temperature from a primary hydrocarbon reformer to a secondary reformer.

Figure 2:
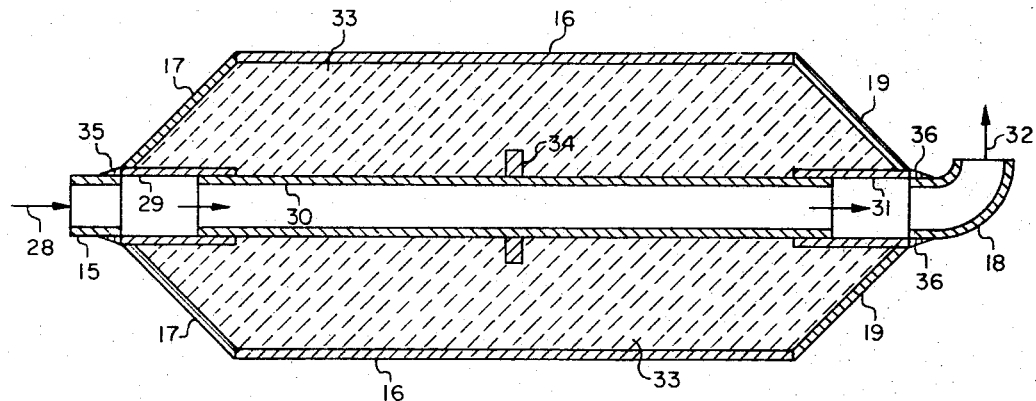
Figure 3:
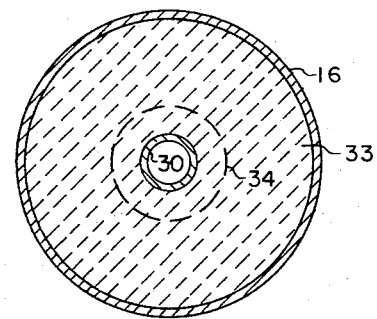

FIGURE 2 is a sectional view taken on section 2—2 of FIGURE 1, and showing a portion of the apparatus in which the fluid-conducting conduit is coaxially disposed within an external conduit and is free to expand in a linear direction at both ends, and FIGURE 3 is a cross-sectional elevation view of a portion of FIGURE 1, taken on section 3—3.

Referring to FIGURE 1, feed streams 1 consisting of a fluid hydrocarbon such as methane or vaporized naphtha, and 2 consisting of steam, are passed via stream 3 into pipe 4, which conducts the process stream mixture into tube 5 which is vertically disposed in primary reformer 6 and contains catalyst bed 7. Tube 5 is externally heated within reformer 6 by the combustion of fuel stream 8, which may consist of a fluid hydrocarbon such as stream 1. Stream 8 is passed together with combustion air stream 9 as mixed stream 10 into burner duct 11. Hot flue gas resulting from the combustion of stream 8 is discharged from unit 6 via outlet pipe 12 as stream 13.

Stream 3 passing downwards through tube 5 in contact with catalyst particles 7 is at a highly elevated temperature such as 850° C. and will usually be at an elevated pressure such as 28 kg./sq. cm., and is converted by the primary reforming reaction into a crude synthesis gas principally containing unreacted hydrocarbon, hydrogen, carbon monoxide and steam. The crude synthesis gas is now transferred for further processing, by means of the transfer piping apparatus of the present invention.

The hot crude synthesis gas passes downwards from tube 5 into the vertical section 14 of a first conduit, and thereafter flows into the horizontal section 15 of the first conduit, which is thus defined by sections 14 and 15. The hot gas stream next passes into a second conduit, not shown in FIGURE 1, which is disposed within and is substantially coaxial with the third conduit 16. A frusto-conical fluid-impervious closure baffle 17 is provided between conduit 16 and the end of section 15.

The hot gas stream now passes from within the coaxial conduit inside conduit 16 into the vertical section 18 of a fourth conduit and flows upwards. A frusto-conical fluid-impervious closure baffle 19 is provided between conduit 16 and the end of section 18. Vertical section 18 is parallel with vertical section 14 of the first conduit, and is of a length substantially equal to that of section 14. The hot gas stream next passes into the first horizontal section 20 of the fourth conduit, which is parallel with conduit 16. Then the gas stream flows through the second horizontal section 21 of the fourth conduit, which is thus defined by sections 18, 20 and 21. Horizontal section 21 is parallel with horizontal section 15 of the first conduit, and is of a length substantially equal to that of section 15.

The hot crude synthesis gas stream is now discharged from section 21 into the upper part of secondary reformer 22, together with process air stream 23 which is admitted into the upper part of unit 22 via pipe 24. A combustion reaction takes place in the upper part of unit 22, with resultant further elevation of the temperature level of the combined gas stream. The synthesis gas stream next flows downwards through catalyst bed 25, which consists of a plurality of catalyst particles. Further conversion of hydrocarbon in the gas stream takes place in bed 25, and the resultant fully reformed synthesis gas is discharged from secondary reformer 22 via lower pipe 26 as stream 27, and is passed to further processing or utilization, not shown.

Referring now to FIGURE 2, the internal apparatus within conduit 16 is shown in a sectional view. The hot gas stream passing through horizontal section 15, designated as stream 28, flows through the first sleeve 29, conduit 30, the second sleeve 31, and is discharged into vertical section 18 as stream 32. Conduit 30 is freely mounted at its ends within sleeves 29 and 31 with sliding fit contact, and thus is free to expand lengthwise in a linear direction at both ends. Linear thermal expansion of conduit 30 takes place in service due to change in temperature, and because of the sliding fit contact of the ends of conduit 30 within sleeves 29 and 31, the conduit 30 is maintained free of thermal stress and compensation for linear thermal expansion is attained. Conduit 30 is preferably disposed substantially coaxial with conduit 16. A bed 33 consisting of refractory packing such as particles of silica, fireclay, kaolin, alumina or magnesite is disposed in the annular space between conduits 30 and 16, so that conduit 16 is maintained at a reduced temperature and thus no appreciable thermal expansion of conduit 16 takes place in service. A circular positioning ring 34 is usually attached externally to conduit 30 and extends outwards into packing 33. Ring 34 serves to prevent a net displacement of conduit 30 within conduit 16, which may otherwise take place due to thermal elongation and displacement. Welds 35 and 36 are suitably provided, in order to attach the several members together in a conventional fluid-impervious manner. Thus weld 35 extends between elements 15 and 29, and weld 36 extends between elements 31 and 18. Further welding closures or other suitable closure means will be provided in practice, as required.

FIGURE 3 illustrates the coaxial arrangement of conduits 30 and 16, which are shown in cross-section as concentric circles, together with the annular refractory packing 33 and positioning ring 34.

Numerous alternatives within the scope of the present invention will occur to those skilled in the art. Thus, the transfer piping assemblage has been shown and described as being essentially horizontal, for horizontal transfer of an elevated temperature fluid. The transfer piping may alternatively be vertically disposed or slanted at an angle, for transfer of a fluid between two points of different vertical elevation. The conduits and sleeves have been shown as being cylindrical, with circular cross-section. In suitable instances the conduits and sleeves may be square or rectangular, or of any desirable configuration and cross-section. It will be appreciated that the sleeves 29 and 31 may consist of direct extensions of conduit sections 15 and 18, respectively, rather than being separate structural elements as illustrated and described supra. The frusto-conical fluid-impervious closure baffles 17 and 19 may alternatively be replaced by suitable closure means of any desired configuration, such as disc-shaped baffles, in which case the conduit 16 would extend to the outer ends of sleeves 29 and 31. The baffles 17 and 19 may alternatively be attached to the ends of conduit sections 15 and 18 respectively, rather than to the sleeves 29 and 31.

It will be apparent that the apparatus of the present invention is applicable to a wide variety of high temperature processing installations, such as in petroleum refining, in which a high temperature fluid is transferred from a rigidly fixed source to a rigidly fixed destination. The apparatus arrangement illustrated in FIGURE 1 provides a preferred embodiment of the present invention, in that thermal deformation or elongation of section 14 in service is compensated by a corresponding thermal deformation or elongation of section 18. Likewise, thermal deformation of section 15 is compensated by the thermal deformation of section 21. Section 20 is of variable length, depending on a specific installation, and thermal elongation of section 20 serves to compensate for possible thermal elongation of conduit 16. Thus, the entire assemblage is maintained in a fully compensated condition regardless of temperature levels and is substantially free of thermal stress.

In a practical application of the transfer piping assemblage as applied to the transfer of crude synthesis gas at 800° C. as described supra, the material of construction for the conduits, baffles and sleeves was stainless steel, with the exception of conduit 16 which was fabricated from carbon steel pipe, since conduit 16 was not exposed to highly elevated temperature levels in service. The small amount of linear thermal expansion of conduit 16 which did take place due to a minor amount of heat transfer and resultant rise in temperature of conduit 16 to 180° C.

was fully compensated by the linear thermal expansion of conduit section 20. The conduit sections 14, 15, 18, 20 and 21 were provided with external pipe insulation to reduce heat loss in service.

I claim:

1. A hydrocarbon catalytic reactor with a thermally insulated linear expansion transfer conduit substantially free of thermal stress for transferring a high temperature partially reformed synthesis gas stream from a primary steam reformer for the catalytic reforming of a fluid hydrocarbon to a secondary reformer for further catalytic reforming of said partially reformed synthesis gas with air which comprises a first conduit, said first conduit having at least two sections of different linear directions, a first sleeve, said first conduit extending from said primary steam reformer to said first sleeve, a second sleeve, said second sleeve being coaxial with and spaced away from said first sleeve, a second conduit, said second conduit extending in a constant linear direction between said sleeves with each end of said second conduit terminating within one of said sleeves with sliding fit contact, whereby linear thermal expansion of said second conduit is accommodated by displacement of both ends of said second conduit within said sleeves, a third conduit external to and substantially coaxial with said second conduit, fluid-impervious closure means extending between each end of said third conduit and one of said sleeves, a bed of refractory packing disposed in the annular space between said second and said third conduit, and a fourth conduit, said fourth conduit extending from said second sleeve to said secondary reformer and having at least two sections of different linear directions.

2. The apparatus of claim 1, in which one section of said fourth conduit is parallel with at least a portion of said third conduit.

3. A hydrocarbon catalytic reactor with a thermally insulated linear expansion transfer conduit substantially free of thermal stress for transferring a high temperature partially reformed synthesis gas stream from a primary steam reformer for the catalytic reforming of a fluid hydrocarbon to a secondary reformer for further catalytic reforming of said partially reformed synthesis gas with air which comprises a first cylindrical conduit, said first conduit having at least two sections of different linear directions, a first horizontal cylindrical sleeve, said first conduit extending from said primary steam reformer to said first sleeve, a second horizontal cylindrical sleeve, said second sleeve being coaxial with and spaced away from said first sleeve, a second cylindrical conduit, said second conduit extending in a constant linear direction between said sleeves with each end of said second conduit terminating within one of said sleeves with sliding fit contact, whereby linear thermal expansion of said second conduit is accommodated by displacement of both ends of said second conduit within said sleeves, a third cylindrical conduit disposed concentrically about and coaxial with said second conduit, two frusto-conical fluid-impervious closure baffles, each of said baffles extending between one end of said third conduit and one of said sleeves, a bed of refractory packing disposed in the annular space between said second and said third conduit, and a fourth cylindrical conduit, said fourth conduit extending from said second sleeve to said secondary reformer and having at least two sections of different linear directions.

4. The apparatus of claim 3, in which one section of said fourth conduit is parallel with at least a portion of said third conduit.

5. The apparatus of claim 3, combined with a circular positioning ring, said positioning ring being externally attached to said second conduit and extending outwards into said packing bed, whereby displacement of said second conduit within said third conduit is prevented.

6. A hydrocarbon catalytic reactor with a thermally insulated linear expansion transfer conduit substantially free of thermal stress for transferring a high temperature partially reformed synthesis gas stream from a primary steam reformer for the catalytic reforming of a fluid hydrocarbon to a secondary reformer for further catalytic reforming of said partially reformed synthesis gas with air which comprises a first conduit, said first conduit having a substantially vertical section and a substantially horizontal section, the vertical section of said first conduit depending downwards from said primary steam reformer, a first horizontal sleeve, the horizontal section of said first conduit extending to said first sleeve, a second horizontal sleeve, said second sleeve being coaxial with and spaced away from said first sleeve, a second conduit, said second conduit extending in a constant linear direction between said sleeves with each end of said second conduit terminating within one of said sleeves with sliding fit contact, whereby linear thermal expansion of said second conduit is accommodated by displacement of both ends of said second conduit within said sleeves, a third conduit external to and substantially coaxial with said second conduit, fluid-impervious closure means extending between each end of said third conduit and one of said sleeves, a bed of refractory packing disposed in the annular space between said second and said third conduits, and a fourth conduit, said fourth conduit having a substantially vertical section and first and second substantially horizontal sections, the vertical section of said fourth conduit extending upwards from said second sleeve to the first horizontal section of said fourth conduit and having a length substantially equal to the vertical section of said first conduit, the first horizontal section of said fourth conduit being parallel with at least a portion of said third conduit and extending to the second horizontal section of said fourth conduit, the second horizontal section of said fourth conduit extending to said secondary reformer and being parallel with and having a length substantially equal to the horizontal section of said first conduit.

7. The apparatus of claim 6, combined with a positioning member comprising a projection externally attached to said second conduit and extending outward into said packing bed, whereby displacement of said second conduit within said third conduit is prevented.

8. A hydrocarbon catalytic reactor with a thermally insulated linear expansion transfer conduit substantially free of thermal stress for transferring a high temperature partially reformed synthesis gas stream from a primary steam reformer for the catalytic reforming of a fluid hydrocarbon to a secondary reformer for further catalytic reforming of said partially reformed synthesis gas with air which comprises a first cylindrical conduit, said first conduit having a substantially vertical section and a substantially horizontal section, the vertical section of said first conduit depending downwards from said primary steam reformer, a first horizontal cylindrical sleeve, the horizontal section of said first conduit extending to said first sleeve, a second horizontal cylindrical sleeve, said second sleeve being coaxial with and spaced away from said first sleeve, a second cylindrical conduit, said second conduit extending in a constant linear direction between said sleeves with each end of said second conduit terminating within one of said sleeves with sliding fit contact, whereby linear thermal expansion of said second conduit is accommodated by displacement of both ends of said second conduit within said sleeves, a third cylindrical conduit disposed concentrically about and substantially coaxial with said second conduit, two frusto-conical fluid-impervious closure baffles, each of said baffles extending between one end of said third conduit and one of said sleeves, a bed of refractory packing disposed in the annular space between said second and said third conduit, a circular positioning ring, said positioning ring being externally attached to said second conduit and extending outwards into said packing bed, whereby displacement of said second conduit within said third conduit is prevented, and a fourth cylindrical conduit, said fourth conduit having a substantially vertical section and first and second substantially horizontal sections, the vertical section of said fourth conduit extending upwards from said second sleeve to the first horizontal section of said fourth conduit and having a length substantially equal to the vertical section of said first conduit, the first horizontal section of said fourth conduit being parallel with at least a portion of said third conduit and extending to the second horizontal section of said fourth conduit, the second horizontal section of said fourth conduit extending to said secondary reformer and being parallel with and having a length substantially equal to the horizontal section of said first conduit.

9. The apparatus of claim 8, in which said first, second and fourth conduits, said sleeves, and said closure baffles are composed of stainless steel, and said third conduit is composed of carbon steel.

References Cited

UNITED STATES PATENTS

| | | | |
|---|---|---|---|
| 2,518,583 | 8/1950 | Watson | 23—288 |
| 2,645,567 | 7/1953 | Thomas et al. | 23—288 |
| 2,654,657 | 10/1953 | Reed | 23—277 |
| 2,848,305 | 8/1958 | Lehrer et al. | 23—277 |
| 2,893,838 | 7/1959 | Stern et al. | 23—277 X |
| 2,937,036 | 5/1960 | Watkins | 285—41 |
| 3,124,424 | 3/1964 | Hartley et al. | 196—155 X |
| 3,223,746 | 12/1965 | Hammond et al. | 1—134 X |

FOREIGN PATENTS

| | | |
|---|---|---|
| 690,403 | 7/1964 | Canada. |
| 1,145,586 | 3/1963 | Germany. |

NORMAN YUDKOFF, *Primary Examiner.*

WILBUR L. BASCOMB, JR., *Examiner.*

F. E. DRUMMOND, *Assistant Examiner.*